Nov. 9, 1965 T. KILBURN ETAL 3,217,298
ELECTRONIC DIGITAL COMPUTING MACHINES
Filed April 18, 1961
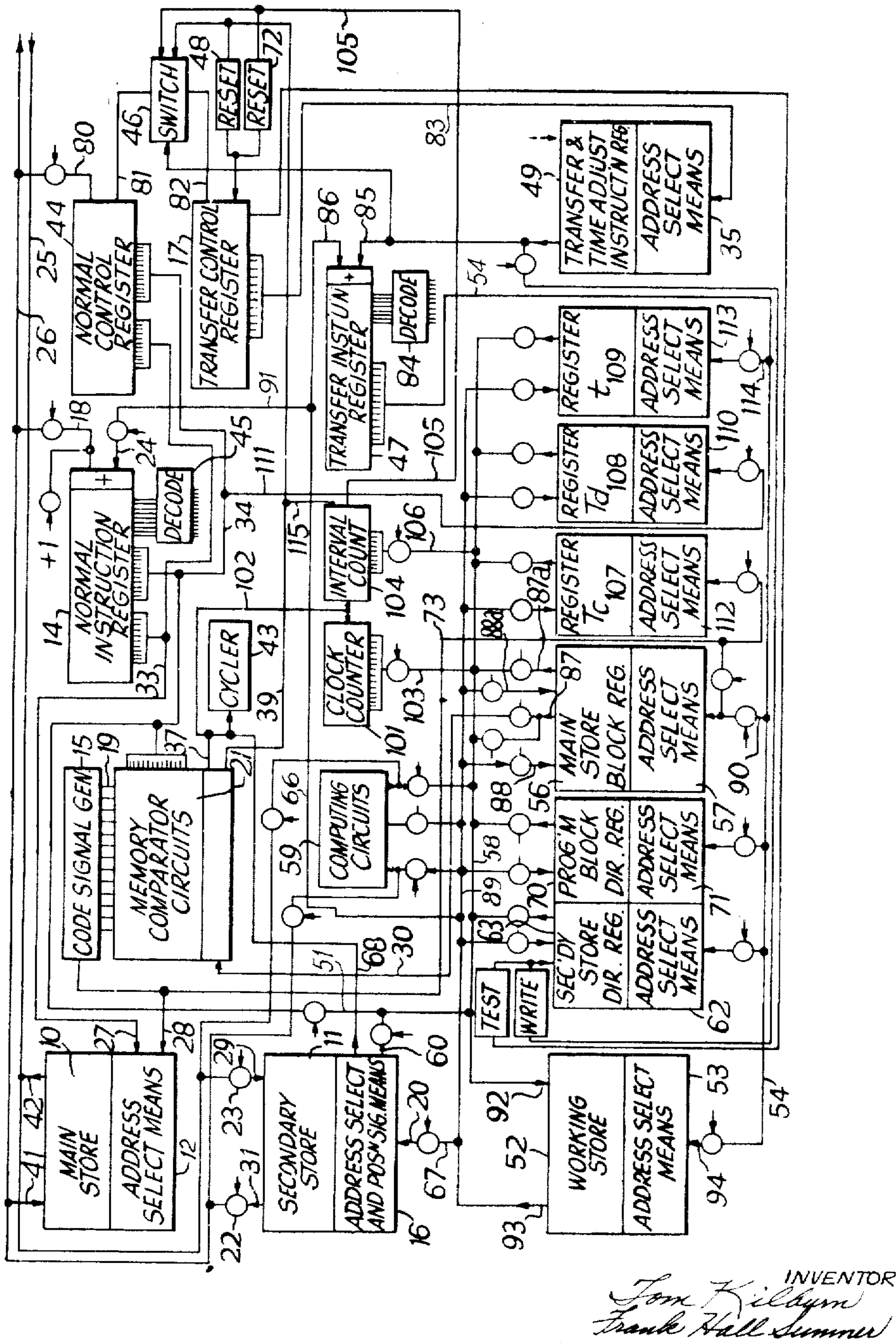
INVENTOR
Tom Kilburn
Frank Hall Sumner
BY
Cushman, Darby & Cushman
ATTORNEY United States Patent Office 3,217,298
Patented Nov. 9, 1965

3,217,298
ELECTRONIC DIGITAL COMPUTING MACHINES

Tom Kilburn, Urmston, and Frank Hall Sumner, Manchester, England, assignors, by mesne assignments, to International Business Machines Corporation, New York, N.Y., a corporation of New York Filed Apr. 18, 1961, Ser. No. 103,786
Claims priority, application Great Britain, Apr. 20, 1960, 13,855/60
15 Claims. (Cl. 340—172.5)

This invention relates to electronic digital computing machines and is more particularly concerned with a machine as described in first co-pending application Serial No. 95,379, filed March 13, 1961, by T. Kilburn and D. B. G. Edwards and in second co-pending application Serial No. 103,785, filed April 18, 1961, by T. Kilburn and D. B. G. Edwards wherein a main data word store of immediate or high access speed but of limited word capacity is employed in conjunction with a secondary data word store of much larger capacity but, usually, lower speed of access and in which means are provided for effecting automatic transfer of a block or group of a predetermined number of data word signals from the secondary store into the main store in the event that an order or instruction signal operative in the machine control system in performance of a normal computing programme calls for a programme data word address whose signal content is not, at that time, present in the main store.

As described in said first and second co-pending applications, the main store comprises a plurality of sections, such as magnetic core storage matrices, each capable of registering a predetermined number, or block, of data word signals and means in the form of a memory comparator circuit are provided for translating the programme address signal of the current order or instruction into a form suitable for effecting selection within the main store of the relevant block of storage locations containing the required single word storage location or, alternatively, for providing an automatic transfer-initiating signal when the word block comprising the required word storage location is not present within the main store.

With such an arrangement it is usually necessary to clear one of the word block sections of the main store by transferring its existing data word contents to the secondary store in order to provide the necessary storage locations in the main store for receiving the respective data words of the new block which is to be transferred from the secondary store. This, in turn, involves the selection for such clearance of one of the plurality of block sections of the main store in a manner which is most suited to the future operation of the machine and which will avoid, as far as possible, transferring from the main store a block of data words containing any word which is likely to be required again in the near future since such renewed requirement would necessitate a further transfer of the just-transferred block back into the main store with the accompanying loss of useful machine operating time.

One possible and previously suggested mode of selection resides in the clearance, in readiness for each new secondary to main store transfer operation, of each main store block section in turn while another and also previously suggested mode is one in which selection of which main store block section is to be cleared is vested in the machine itself and is based upon the frequency of past-usage of each of the different main store block sections, the block section having the least frequent past-usage being that chosen for clearance.

An object of the present invention is the provision of a further alternative and advantageous mode of selection based upon an analytical examination of the usage history of each of the word blocks currently located in the main store and the selection, for clearance, of one block according to a choice determined principally by the respective periods of time during which each block has been located in the main store without use having been made thereof. To achieve the required analysis, a machine in accordance with the invention is so arranged that at each transfer operation, in addition to effecting the requisite clearance of a main store block storage location and the transfer of a secondary store word block thereinto, a special pre-transfer order programme is initially executed by which the above described choice is effected and by which, also, appropriate adjustment of certain registered transfer time and usage information is made in respect of each of the different main store word blocks.

Briefly, for each block of data in the main store, certain facts are determined and held in specially provided register means. A first means registers the idle time ($Tc$) *between* successive usages of each data block in the main store and a second means registers the time ($t$) which has elapsed *since* the last usage of each data block in the main store. A third means registers both identifiers for every data block in the main store and whether each such data block has or has not been used within a previous preset time interval.

In the normal operation of the computing machine, data blocks are continuously being referred to by the machine instructions. If during the preset time interval, no reference is made to any data block in the secondary store but only to data blocks in the main store, the machine action is automatically interrupted at the termination of the interval and the information held in the second and third register means is updated and adjusted to reflect the current time status.

If, on the other hand, a data block is requested which is stored in the secondary store, such data block must be transferred to the main store where it can be utilized as requested. As aforementioned, to determine where in the main store the requested data block is to be transferred is the main object of this invention. Comparison means are therefore provided which first updates the information held in the first and second register means and then examines the identifiers held in the third register means to determine if any data block in the main store is available, that is, has no information presently stored therein. If all the main store memory blocks are found to be occupied, the comparison means progresses to an examination of the contents of the first and second register means. For each data block in the main store, the comparison means determines whether the elapsed time since the block's last use ($t$) is greater than its idle time ($Tc$) between successive uses or ($t-Tc$). The first block giving a positive answer to this determination becomes the prime candidate for transfer.

If ($t-Tc$) is negative for all blocks in the main store, the comparison means proceeds to a second test to determine whether the elapsed time $t$ is 0 or not and if not 0, to determine the quantity ($Tc-t$) for each block and then choose the block where the greatest positive corresponding difference occurs. This test takes into account not only the length of the idle times but also the block least likely to be used again before all other blocks in the memory. If no block is found by this test, a third test is performed (provided all $t$'s are found to be 0) to determine which block has the longest idle time $Tc$. The block thus determined is the one transferred.

In order that the nature of the invention may be more readily understood, one particular embodiment thereof will now be described by way of illustrative example only and with reference to the accompanying drawing, whose single figure is a block schematic diagram showing the principal components of an electronic digital computing machine including the invention.

The arrangements illustrated closely resemble those described in the aforesaid second co-pending application, except for the elimination of the particular form of block clearance selector device 50 described therein and the incorporation of further elements to be described later.

The machine about to be described is one arranged for operation in the parallel mode and with binary form numbers. Accordingly, where reference is made to a "multiple," such term is to be construed as meaning a group of separate conductors, one for each signalled digit value, while reference to "gate means" in association with such multiples is intended to mean the control by gate circuit means of all of the separate digit leads of the multiple by means of one or more control signals. Such multiples or conductor groups are shown in the drawings only as a single line while, in the interests of clarity, the various gate control signal connections and other elements have been omitted since their construction and arrangement follow the now well known forms and practices of the art.

The embodiment shown comprises a main or high access speed store 10, a secondary store 11, an instruction or order register 14 with an associated control register 44 for normal machine control purposes during execution of a computing programme, a separate transfer control register 17 and an associated transfer instruction register 47, a memory-comparator circuit 21 and an associated code signal generator 15, and a group of special word and digit storage registers including a transfer instruction store 49, a main store block register 56, a secondary store directory register 63, a programme block directory register 70 and a so-called working store 52.

As it is a feature of this invention that an address as defined by the address digits of an instruction or order has no constant relationship to any one or any particular group of storage locations within the machine, it is pointed out that when, hereinafter, reference is made to a "programme" address number or a "programme" block number, the intention is to refer to the address digit configuration as used in the order or instruction of the programme for a particular computing operation being performed, whereas reference to a "store" block number or a "store" address, means the address identification of a particular word storage location or a particular group of separate storage locations within a particular piece of apparatus.

The main store 10 conveniently comprises eight magnetic core storage matrices each capable of registering 1024 data words in the form of 16 blocks of 512 words each. Address selection within the main store 10 is by address select means 12 which may comprise the usual diode tree circuits. Selection of a desired one of the 16 store block positions is effected by a group of eleven digit signals $d12 \ldots d22$ of an address and applied by way of an input multiple 28. The similar selection of any desired single word storage location in any selected block in store 10 is effected by a group of nine digit signals $d3 \ldots d11$ of the same address and applied by way of input multiple 27. The write input multiple of the main store 10 is indicated at 41 and the read-out multiple at 42.

The secondary store 11 conveniently consists of one or more magnetic drum stores capable of providing 512 separate block storage locations available sequentially and each capable of registering a block of 512 separate words. Selection within the secondary store 11 is effected on a block basis only by address select means 16 which may again be of any well known form and include means for providing an output signal $\theta$ which is indicative of the store address of the next block storage location which will become available and is in the form of a group of address digit signals corresponding to those of register 14 for the same block. In addition, such address select means 16 include a coincidence testing circuit to which the $\theta$ signal is applied for comparison with a block address signal fed to the input 20. When coincidence is established, a signal is emitted over lead 68. The said $\theta$ signal is also available externally on lead 60. The write input multiple to the secondary store 11 is indicated at 29 while the read output multiple is shown at 31. The latter is connected by way of transfer gate 22 to the write input 41 of main store 10 while the write input of the store 11 is fed through transfer gate 23 from the read output multiple 42 of the main store 10.

The precise form of the main and secondary stores is of no concern to the present invention.

The write input multiple 41 and the read output multiple 42 of the main store 10 are also connected in the usual way to highways 26 and 25 respectively feeding the other parts of the machine including the normal instruction and control registers 14, 44 and the computing circuits 59.

The instruction register 14 may be of any known form and provides the necessary address and function controlling signal outputs. This register 14 includes add or substract means for combining a first instruction signal with a modifying signal in known manner. The normal instruction signal input is shown at 24 and the modifier signal input at 18. The usual decode circuits indicated at 45 provide the necessary control and other signals for operating the machine in accordance with the function digits of the applied instruction. The word and block address signal outputs are fed over multiples 33, 34 to the address select means 12.

The associated normal control register 44 is again of any suitable known form and can be set according to the digit configuration of an applied input signal on the multiple 80 and progressively altered during machine operation to define the addresses of the various successive orders of a programme. This control register is arranged to be capable of being immobilised by an input signal on lead 81 from switch device 46 referred to later. The respective word and block address defining digit signal outputs from this control register are also fed over multiples 33 and 34 to the address select means 12 in parallel with those from the instruction register 14.

The transfer control register 17 is similar to the register 44 and is also arranged to be capable of being immobilised by a signal from the switch means 46 over lead 82. This control register 17 is also arranged to be capable of being reset either to a first particular chosen digit configuration by reset device 48 or to a second chosen digit configuration by an alternative reset device 72. This transfer control register also includes the usual arrangements for progressively altering the control number stored therein after the end of each operation cycle so as, normally, to select the next order of the series. The various digit signal outputs from the control register 17 are applied over multiple 83 to the address select means of the transfer instruction store 49.

The transfer instruction register 47 is basically similar to that of the normal instruction register 14 and includes function decode means 84 operated by the function digit signals of an applied instruction to provide control potentials to various gate and other devices operative during the automatic transfer and time adjusting cycles. The instruction signal input to the instruction register 47 is indicated at 85 while the modifier input is shown at 86.

The memory comparator circuit 21 is described in detail in the aforesaid first co-pending application and effectively comprises sixteen separate banks of combined trigger and equivalence detecting circuits. One input to each equivalence detecting circuit is derived from the associated trigger circuit whereas the other input is provided by the related address digit signal of the block identifying group provided over multiple 34 from the instruction register 14 or the similar outputs of the control register 44.

Each trigger circuit in each bank of the memory comparator circuit is arrangd to be set to one or the other of its two alternative states in accordance with the related digit value of the block identifying address signal, such setting inputs being fed by way of multiple 30 from the register 56. Each bank of the memory comparator circuit has an individual output lead 19 which is energized if, but only if, the setting states of all of the memory trigger circuits of that bank coincide with the applied digit signals on multiple 34. When such coincidence occurs, the corresponding output signal on the related lead 19 provides an input to the code signal generator 15 which is again of the form as described in the first co-pending application. This signal generator effectively provides, in response to energization of any input lead 19, a 4-digit signal combination within the range 0000, 0001 . . . 1111 according to the particular bank of the memory comparator circuit 21 where coincidence has been established. Such 4-digit signal from the code signal generator forms the block identifying signal input to lead 28 of the address select means 12. In addition, the memory comparator circuit 21 provides an output on lead 37 when coincidence is established in any one of the banks or, alternatively, provides a non-equivalent output signal on lead 39 when there is failure to establish coincidence in any one of the banks of trigger circuits.

The register 56 is similar to that described in the aforesaid second co-pending application and comprises a multi-address word storage device of any convenient type, for example, a magnetic core store matrix, and its associated address select means 57 which again may comprise diode tree circuits of known form. This register has 16 separately identifiable storage locations, one for each of the block positions of the main store 10, and each is selectable through the address selection means 57 by the 4-digit main store block selecting signal on multiple 28 by way of multiple 73. This register has a first read output at 87 and a first write input at 88. In addition, at each address position there is an additional and separate digit storage position for recording a "use" digit related to the use or non-use of the corresponding main store block. **87*a* indicates the read output of this separate digit store while 88*a* indicates the write input. The read outputs 87 and 87*a* are connected over multiple 58 to the write input 92 of the working store 52 while output 87 is also, as already mentioned, connected by way of multiple 30 to the setting input of the memory comparator circuit 21. The write inputs 88 and 88*a* are supplied over multiple 89 from the read output 93 of the working store 52. The input to the address selection means 57 also is capable of being supplied with controlling input signals over multiples 90 and 54 from the transfer instruction register 47**.

The working store 52 is again a multi-address word storage device with associated address selection means 53. The write input to the store is indicated at 92 while the read out is indicated at 93. The address selection input at 94 is supplied over multiple 54 from the transfer instruction register 47. This working store is used as a temporary and operational storage during the various steps of the transfer and time adjusting operations and various exclusive address locations therein will be referred to later as work locations *w*1, *w*2, *w*3 . . . .

The secondary store directory register 63 and the programme block directory register 70 are described in some detail in said second co-pending application, but as they do not perform any active part in the present invention they will not be further described.

As will be seen from the drawing, the respective address signal inputs to the address select means 62, 71 and 57 are all supplied through gate control means and multiple 54 from the transfer instruction register 47. The read output 93 of the working store 52 is connected by way of multiple 67 to the address selection input 20 of the secondary store address selection means 16 and also over multiple 89 to the write inputs of the registers 63, 70 and 56 and also by way of multiple 66 to the modifier input 86 of the transfer register 47 and by way of multiple 91 to the normal instruction register 14. Multiple 51 provides a connection from the block digit signal output of the instruction register 14 to the write input 92 of the working store 52 while the signal output 60 of the address selection means 16 is also connected to this write input 92, as are also the read outputs of the registers 63, 70 and 56.

The transfer and time adjust instruction register 49 may be of any convenient form but as it is not normally necessary or even desirable to alter the form of any word stored therein, such store may be of fixed type comprising, for instance, a number of separate magnetic core devices having a removable magnetic core slug whereby the desired word configuration of each address location may be set by hand and not changeable otherwise. Such store has associated therewith address selection means 35 of any convenient form and whose address selection signal input is derived from the digit signal output of the transfer control register 17 over multiple 83.

The machine components so far described are those of the arrangements described in greater detail in the aforesaid second co-pending application to which reference should be made for further information.

The additional components provided to carry out the present invention comprise a counter device or "clock" 101, which is arranged to increase its count state or "time" value by one step each time the machine obeys an instruction by means of pulses supplied over lead 102 from the equivalence signal output 37 of the memory comparator circuit 21. The, continuously increasing, count state output of this clock counter 101 is connected by way of gate controlled multiple 103 to the write input 92 of the working store 52. A further, generally similar, interval counter device 104 is also supplied with input pulses from lead 102 and operates to count interval periods of, say, 1024 machine operations at which instant it provides an interrupt output signal $\Delta T$ over lead 105 to operate the switch means 46 and to actuate the second reset device 72. At the next following pulse input it becomes reset automatically to zero to recommence counting. Its particular count state at any time is available, as the $\delta t$ signal referred to later, by way of multiple 106 which also feeds the write input 92 of the working store 52. This interval counter is also capable of being reset to zero at any time by a pulse input over lead 115 from the non-equivalent signal lead 37 of the memory comparator circuit 21.

In addition to the modification of the main store block register 56 already referred to, three further multiple address registers 107, 108 and 109 are provided. Such registers are shown as separate entities on the drawing but in practice they may well be different portions of a single storage device such as a magnetic core storage matrix along with the other registers 56, 63 and 70.

Register 108 has 512 separate storage locations, one for each usable programme block address number; such addresses being selectable by address select means 110 under the control of the 11-digit block number signal on mulitple 34 and supplied over multiple 111. The write input and read output of this register are connected respectively over multiples 89 and 58 to the read output 93 and write input 92 of the working store 52.

Registers 107 and 109 each have sixteen separate storage locations, one for each block location of the main store 10; the address select means 112 of register 107 is supplied with the 4-digit code signal output of generator 15 over multiple 73 while the address select means 113 of register 109 is supplied with equivalent 4-digit signals by way of multiples 114 and 54 from the outputs of the transfer instruction register 47.

The normal machine computing circuits 59 are also made available for operational use during the periods when time value adjustments and choice of the main store block for clearance are being made by connection of the computing circuit inputs over multiple 89 to the read output 93 of the working store 52 and the corresponding connection of the computing circuit output over multiple 58 to the write input 92 of said working store.

Before describing the manner of operation of the arrangements described when concerned with the subject of the present invention, it is first pointed out that the manner of operation during both normal machine operation periods and during automatic transfer periods is described in some detail in the aforesaid second co-pending application and need not be dealt with here apart from stating that each normal machine operation involving use of one of the word blocks in the main store 10 results in the emission of the equivalence signal on lead 37, that the programme address of the used word block is at the same time signalled on the multiple 34, that the main store block in which such used word block is located is given by the code signal generator output on multiple 28 and that each transfer operation is preceded by the emission of a non-equivalence signal on lead 39.

The register 49 now contains two separate groups or sub-routines of instructions, one commencing at address $x$ dealing with adjustment of the timing records at each regular interrupt interval and the other, commencing at address $y$, dealing with both adjustment of the timing records and the automatic transfer and ancillary operations. Reset device 72, when operated, resets register 17 to number $x$, whereas reset device 48, when operated, resets the same register 17 to number $y$.

In each of the different 512 locations of the register 108 is registered a "clock time" value $Td$ which is the count state of the clock counter 101 at that instant when the particular word block was last used in machine operation before it was transferred from the main store 10 to the secondary store 11. In each of the 16 storage locations of the register 107 is registered, at the instant when a 512-word block is transferred from the secondary store 11 into the related block location of the main store 10, a "time" value $Tc$, such value $Tc$ being the count state of the clock counter 101 at the instant of transfer (T) less the value $Td$ (referred to above) already registered in register 108 for the particular programme block being transferred. In each of the 16 storage locations of register 109 is registered a "time" value $t$ which is determined in a manner which will be described below. In each of the single digit parts of the 16 storage locations of register 56 is registered a "use" digit, such digit being set to zero after each transfer operation or after each machine interrupt condition as described later and being set to value "1" immediately any word in that block location of the main store 10 is referred to during normal machine operation.

The manner of operation is as follows. During normal computing operation by the machine, each time an equivalence signal is emitted on lead 37 from the memory comparator circuit 21, the resultant pulse over lead 102 advances the clock counter 101 and the interval counter 104 by one step. Unless a call for an automatic transfer operation has occurred in the meantime, the interval counter 104 eventually reaches its maximum count condition at which time the output signal, $\Delta t$, on lead 105 therefrom causes a machine interruption by operating the switch 46 to transfer control from the normal control register 44 and instruction register 14 to the transfer control register 17 and the transfer instruction register 47 in a manner broadly similar to that described for automatic transfer operation in the aforesaid second co-pending operation. During such interrupt condition, however, the orders read from the transfer and time-adjust instruction register 49 comprise a difference series starting at a different number in the pre-set programme. This start number is automatically selected by operation of the reset means 72 by the same, $\Delta t$, signal on lead 105, instead of the reset means 48 of the transfer means, to cause the transfer control register 17 to be set at the proper number to select the first instruction of the subroutine for dealing with such interrupt operation. Such series of interrupt orders comprises the selection under control of the transfer instruction register 47 of the successive address locations of the register 109 and the register 56. The "use" digit for address 1 in register 56 is first examined by transfer to the working store 52 and subsequent use of the computing circuits 59 to detect whether it is of value "1," indicating use in the immediately preceding period, or a value "0" indicating nonuse in such period. If such examined digit value is "0," the existing time value $t$ stored in the related address 1 of the register 109 is then altered by adding a number equivalent to the total count number, i.e. $\Delta t$, of the interval counter 104 thereto. This is effected by reading out such previous number $t$ to a suitable address in the working store 52 and then transferring it to the computing circuits 59 together with a number signal representing the interval count number $\Delta t$ to effect the addition of the two numbers and then transferring the answer number back to the same address 1 in the register 109, again by way of the working store 52. If, on the other hand, the said registered "use" digit value for the address 1 in the register 56 is of value "1," the previously existing time value $t$ for such address 1 in the register 109 is erased whereby the value $t$ becomes zero. The next instruction of the interrupt programme then resets the "use" digit for address 1 in register 56 to zero. The following instructions cause the same group of steps to be repeated for each of the separate addresses 2 . . . 16 in the registers 109 and 56.

Upon the occurrence of a demand for an automatic transfer operation, the manner of operation of which is described in the aforesaid second co-pending application, there is an initiating non-equivalence signal on lead 39 from the memory comparator circuit 21 caused by the non-coincidence of the applied programme word digits on multiple 34 with the setting states of any of the related banks of the memory comparator circuit. Such non-equivalence signal on lead 39 causes the operation of switch means 46 to transfer control from the registers 14 and 44 to the registers 17 and 47 exactly as described in the aforesaid second co-pending application and the simultaneous operation of the reset means 48 this time to alter the number set up in the transfer control register 17 to the address of the first of the alternative sub-routines of transfer control instructions held in the transfer and time-adjust instruction register 49. This second set of transfer instructions comprises those which are dealt with in detail in the aforesaid second co-pending application preceded by a group of further time adjusting and store block selecting instructions as follows.

The first time adjust time instructions of the group are substantially identical with those already described above for use under interrupt conditions whereby each of the 16 storage addresses in registers 109 and 56 is altered except that in this transfer case, as the interval counter 104 has probably not reached its maximum value $\Delta t$, the particular count number at the moment $\delta t$ which is a measure of the time intervals since the last interrupt or transfer operation is added to the existing number $t$ in register 109 if the related use digit for the same numbered store block address in register 56 is zero.

The next instructions of the transfer sub-routine are concerned with the choice of the main store block which is to be cleared and these take the place of the previous instructions described in the aforesaid co-pending second application in which use was made of the selection signal output of the device 50 of that application.

The first instructions in the choice selection section of the programme sub-routine in the register 49 are concerned with an examination of the contents of each of the main store blocks 10 to see whether any one block is already empty. This is effected by the use of an instruction which reads the contents of the main word storage section of address 1 in the register 56 to a suitable address within the working store 52 from which, by the next instruction, such number is then fed to the computing circuits 59 where it is caused to be subtracted from zero. If the resultant answer is negative, it is indicative that the store is still occupied whereas a positive answer indicates that the said address is actually vacant. By the use of the well known conditional transfer technique, such presence of a positive answer is used to change the number of the transfer instruction register 47 by supply of a suitable number from store 52 over input lead 86 to a number which defines the address of the sub-routine in the register 49 of the first instruction of the actual transfer operation. If examination of address 1 fails to find it to be empty, the sub-routine so far described is repeated for each of the addresses 2 . . . 16 in register 56 in turn. Failure to find any one of the main store blocks already vacant is then followed by a further group of selection instructions in the register 49, the first of which selects address 1 in register 109 and transfers the content *t* thereof to a suitable space in the working store 52. This is followed by the selection of address 1 in register 107 and the transfer of the number Tc to another suitable address in the working store 52. By transfer of such number *t* and Tc from the working store 52 to the computing circuits 59 by further instructions in the register 49, the number Tc is subtracted from the number *t* to determine whether *t* is greater than Tc, evidenced by a positive answer. If the answer is positive, then by means of further orders using the known conditional transfer technique, the instruction register 47 is again advanced in number to the first instruction proper of the actual sub-routine. If, on the other hand, a negative answer is obtained for address 1, the same procedure is repeated for each of the further addresses 2. 1. 6. of the respective registers 108 and 107 until all have been examined and all have failed to show the presence of numbers *t* therein greater than the related values Tc. In the latter event, the time-adjust and transfer sub-routine in register 49 proceeds to a next group of test orders which determine in broadly similar manner whether the main store block 1 of the main store 10 has a recorded time value *t* (in register 109) which is not zero and in which the difference between the recorded value Tc in register 107 is greater than the value *t* in register 109. The answer to this operation is recorded on a temporary address in the working store 52 and the same cycle repeated for each of the other addresses 1. 1. 6. of register 107 and 109 with similar recording of the answers on fifteen further locations in the working store 52. In the event that more than one answer shows a positive value for Tc—*t*, then the two or more answers obtained are subtracted one from the other to determine which is the greatest and the store address showing such greatest value is then the one chosen for selection and clearance. To cover the possibility that no selected block has yet been found, the series of test and selection instructions in the transfer instruction register 49 includes a fourth group, the first order of which selects address 1 in register 109 and examines the value *t* therein for zero. Conditional upon such value being found zero, the recorded value Tc in register 107 is then transferred to a suitable address in the working store 52. A similar series of operations is performed for each of the other addresses 2. 1. 5. in the registers 107 and 109 and thereafter the various recorded values Tc which have been inserted in the working store 52 are examined by subtraction from one another to determine which is the greatest. The main store block corresponding to the address number in registers 107, 109 providing the largest vlue Tc is then the one selected for use in the subsequent transfer operation. Thereafter the sub-routine of instructions in the register 49 is concerned with the actual transfer operation itself and is as described in the aforesaid second co-pending application. As a prelude however to the actual transfer of the selected block from the main store 10 and its insertion in the secondary store 11, the address of such block, available on the multiple 34, is applied over multiple 111 to select the related address in the register 108 while the number Td on the related address position in the register 108 is first transferred to the working store 52 and then subsequently read from the working store into the selected address location of the register 108 to form a record of the clock counter setting at which the particular programme block about to be transferred was last used in the machine.

A selection by an analytical programme as described above has been found to take into account many of the often conflicting and variable factors concerned with the probability of future use of a block of data words which have previously been transferred into the main store, and to avoid, to a very large extent, the removal from such main store of any block of words which is likely to be required at an early time constant of the immediately following periods of machine operation.

The actual constructional arrangements employed may obviously be varied within very wide limits. For example, all of the various registers 107, 108, 109 and 56 can form part of a single multiple address word storage device and may be part of the same device as the further registers 63 and 70. The machine is also capable of being arranged for serial instead of parallel mode operation.

We claim:

1. An electronic digital computing machine which comprises a main data word store having a plurality of separate storage positions and signal controlled address selection means for rendering any chosen one of said storage positions accessible, a secondary data word store having a plurality of separate storage positions and signal controlled address selection means for rendering any chosen one of said storage positions accessible, word transfer channels between said main and secondary stores, transfer control means for effecting transfer over said transfer channels of data words from a storage position in said secondary store to a selected storage position in said main store and storage position selection means for selecting the position in said main store to be made operative to receive the data words transferred from said secondary store, said storage position selection means comprising a machine operation counter device advanced step by step at each machine operation involving use of a data word position in said main store and providing a machine operation time-representing output signal, register means having separate storage locations for each of said storage positions in said main store, means for periodically registering in each of the separate storage locations of said register means time data signals derived from said machine operation counter device, which are indicative of the operative use of the related storage position of the main store and signal examining means for successively examining and comparing the separate time data signals registered in said register storage locations to determine by the relative values of such signals the position to be made operative for transfer in said main store.

2. An electronic digital computing machine according to claim 1 in which said transfer control means includes means for effecting transfer of any data words currently held in said selected storage position of said main store to said secondary store before said transfer of data words from said secondary store to said selected storage position of said main store.

3. An electronic digital computing machine according to claim 2 in which said transfer control means operate to transfer at each operation a block group of the contents of a predetermined number of word storage positions in said main and secondary stores and in which said usage timing signals registered in said register means relate to each of said block groups collectively.

4. An electronic digital computing machine according to claim 3 which includes an interval counter device connected to cause its count state to be advanced step-by-step in unison with said clock counter device, which interval counter device includes means for automatically resetting its count state to zero at each machine operation involving transfer of data words between said main and said secondary stores.

5. An electronic digital computing machine according to claim 4 in which said interval counter device is arranged automatically to reset to zero upon reaching a predetermined maximum count number and to provide an electric control signal indicative of such attainment of its maximum count number.

6. An electronic digital computing machine according to claim 5 which includes machine operation interrupt means operated by said control signal from said interval counter device to interrupt normal computing operation by the machine and to cause alteration of the respective time data signal for said main store data storage positions registered in said register means.

7. An electronic digital computing machine according to claim 6 in which said register means includes a first multi-address signal storage device having a separate storage location for each of the block groups of data words held in said secondary store and which includes means for registering in each of said storage locations a count number T*d* which is the count state of said clock counter device at the instant when the block of data words related to said location was last used operatively in the machine before it was transferred to said secondary store.

8. An electronic digital computing machine according to claim 7 in which said register means includes a second multi-address signal storage device having a separate storage location for each of the word block storage positions in said main store and which includes means for registering in each of said storage locations of said second device a number T*c* which is the count state of said clock counter device at the instant of transfer of the related data word block into the main store less the count number T*d* for the same data word block as registered in said first register.

9. An electronic digital computing machine according to claim 8 which includes a third register having a separate storage location for each of the word block storage positions in said main store and which includes means for registering in each of said storage positions a signal indicating whether any word position of said word block has been used operatively by the machine since a previous and predetermined time instant.

10. An electronic digital computing machine according to claim 9 which includes a fourth register having a separate storage location for each of the word block positions in said main store and which includes means for registering in each of said storage positions a number *t* derived by examination of the storage position for the same block in said third register and the output signals from said interval counter device.

11. In an information handling system which includes a main data memory and a secondary data memory, data transfer channels between said memories and data channel control means for effecting transfer of selected portions of said data between said memories via said transfer channels in response to selected portion data signals, the combination comprising: first means for registering idle time (T*c*) between successive usages of each portion of data in said main data memory; second means for registering elapsed time (*t*) since the last usage of each portion of data in said main data memory; comparison means coupled to said data channel control means and said first and second registering means, said comparison means adapted to determine for any said portion of data, the difference between said successive usage time (*t*) as registered in said second means and said idle time (T*c*) as registered in said first means ($t-Tc$) and to provide a selected portion data signal if a positive time difference is determined; whereby said data channel control means responds to said signal to cause said selected data portion to be transferred from said main memory to said secondary memory.

12. The invention as claimed in claim 11 wherein said comparison means repetitively performs said determination for all said portions of data in said main data memory.

13. The invention as defined in claim 12 wherein said comparison means includes apparatus which responds to a manifestation of all negative differences from said repetitive determination to further determine for each said portion of data, the greatest difference between said idle time (T*c*) as registered in said first means and said successive usage time (*t*) as registered in said second means ($Tc-t$) to thereby provide a selected portion data signal indicative of a data portion having the greatest positive time difference.

14. The invention as defined in claim 12 wherein said comparison means includes apparatus which is adapted to determine if zero elapsed time registrations exist for all said data portions in said second means and if so, to determine said greatest successive usage time (T*c*) for a data portion, as registered in said first means, and to provide a selected portion data signal indicative of said determination.

15. An electronic digital computing machine which comprises a main data word store having a plurality of separate storage positions and signal controlled address selection means for rendering any chosen one of said storage positions accessible, a secondary data word store having a plurality of separate storage positions and signal controlled address selection means for rendering any chosen one of said storage positions accessible, word transfer channels between said main and secondary stores, transfer control means for effecting transfer over said transfer channels of data words from a storage position in said secondary store to a selected storage position in said main store and storage position selection means for selecting the position in said main store to be made operative to receive the data words transferred from said secondary store, said storage position selection means comprising a machine operation counter device advanced step by step at each machine operation involving use of a data word position in said main store and providing a machine operation time-representing output signal, a first multi-address signal storage device having a separate storage location for each of the block groups of data words held in said secondary store and which includes means for registering in each of said storage locations a count number T*d* which is the count state of said clock counter device at the instant when the block of data words related to said location was last used operatively in the machine before it was transferred to said secondary store, a second multi-address signal storage device having a separate storage location for each of the word block storage positions in said main store and which includes means for registering in each of said storage locations of said second device a number T*c* which is the count state of said clock counter device at the instant of transfer of the related data word block into the main store less the count number T*d* for the same data word block as registered in said first register, a third register having a separate storage location for each of the word block storage positions in said main store and which includes means for registering in each of said storage positions a signal indicating whether any word position of said word block has ben used operatively by the machine since a previous and predetermined time instant, a fourth register having a separate storage location for each of the word block positions in said main store and which includes means for registering in each of said storage positions a number *t* derived by examination of the storage position for the same block in said third register and the output signal from said interval counter device, and signal examining means for successively examining and comparing the separate usage timing signal values registered in said register storage locations to determine by the relative values of such timing signal values the position to be made operative for transfer in said main store.

References Cited by the Examiner

Pages 9 through 48, 1958, I.B.M., Reference Manual, RAMAC 305.

Pages 2–144 through 2–146, 1959, Handbook of Automation Computation and Control, vol. 2.

ROBERT C. BAILEY, *Primary Examiner.*

IRVING L. SRAGOW, *Examiner.*